US012140068B1

(12) United States Patent
Boo et al.

(10) Patent No.: US 12,140,068 B1
(45) Date of Patent: Nov. 12, 2024

(54) WATER MANAGEMENT SYSTEM FOR A HYDROGEN ENGINE

(71) Applicants: HYUNDAI MOTOR COMPANY, Seoul (KR); KIA CORPORATION, Seoul (KR); HYUNDAM INDUSTRIAL CO., LTD., Asan-si (KR)

(72) Inventors: Seon Woo Boo, Hwaseong-si (KR); Ju Tae Song, Hwaseong-si (KR); Seong Cheol Cho, Seoul (KR); Sung Won Lee, Hwaseong-si (KR); Seung Hwan Kim, Pyeongtaek-si (KR); Yong Taek Hwang, Cheonan-si (KR); Bu Hyeon Cho, Cheonan-si (KR); Seung Hwan Lee, Cheonan-si (KR)

(73) Assignees: HYUNDAI MOTOR COMPANY, Seoul (KR); KIA CORPORATION, Seoul (KR); HYUNDAM INDUSTRIAL CO., LTD., Asan-si (KR)

( * ) Notice: Subject to any disclaimer, the term of this patent is extended or adjusted under 35 U.S.C. 154(b) by 0 days.

(21) Appl. No.: 18/535,474

(22) Filed: Dec. 11, 2023

(30) Foreign Application Priority Data

Jun. 26, 2023 (KR) ........................ 10-2023-0081619

(51) Int. Cl.
*F01P 3/20* (2006.01)
*F01P 5/10* (2006.01)
(Continued)

(52) U.S. Cl.
CPC .................. *F01P 3/20* (2013.01); *F01P 5/10* (2013.01); *F01P 11/028* (2013.01);
(Continued)

(58) Field of Classification Search
CPC ............... F02B 43/10; F02B 2043/106; F02M 21/0206; F02M 21/0221–0225;
(Continued)

(56) References Cited

U.S. PATENT DOCUMENTS 3,101,592 A * 8/1963 Robertson ............... C01B 3/065 60/39.463
3,608,529 A * 9/1971 Smith ..................... F02B 47/00 123/25 C (Continued)

FOREIGN PATENT DOCUMENTS

CN 1201865 A * 12/1998
KR 100763822 B1 * 10/2007

(Continued)

*Primary Examiner* — John M Zaleskas
(74) *Attorney, Agent, or Firm* — Lempia Summerfield Katz LLC

(57) ABSTRACT

A water management system for a hydrogen engine is capable of reducing a capacity of a water tank for storing cooling water injected into the hydrogen engine and is capable of not requiring separate replenishment of water for the water tank. The water management system includes: a water tank module, which stores water for cooling the hydrogen engine; a water pump provided at the water tank module and configured to supply the water stored in the water tank module to the hydrogen engine; and an exhaust line provided between the hydrogen engine and the water tank module and configured to supply an exhaust gas, which contains water vapor discharged from the hydrogen engine, to the water tank module.

12 Claims, 5 Drawing Sheets

(51) Int. Cl.
*F01P 11/02* (2006.01)
*F02M 25/022* (2006.01)
*F02M 25/025* (2006.01)
*F01P 3/00* (2006.01)
*F02M 21/02* (2006.01)

(52) U.S. Cl.
CPC .... *F02M 25/0221* (2013.01); *F02M 25/0222* (2013.01); *F01P 2003/001* (2013.01); *F02M 21/0206* (2013.01); *F02M 25/025* (2013.01)

(58) Field of Classification Search
CPC .... F02P 3/20; F02P 5/10; F02P 11/028; F02P 2003/001; Y10S 123/12
See application file for complete search history.

(56) References Cited

U.S. PATENT DOCUMENTS 3,672,341 A * 6/1972 Smith .................... F02B 47/02 123/305
3,682,142 A * 8/1972 Newkirk ................ F02B 43/10 123/3
3,696,795 A * 10/1972 Smith .................... F02M 25/00 123/25 C
3,702,110 A * 11/1972 Hoffman .................. F02G 1/04 60/39.5
3,983,882 A * 10/1976 Billings ............ F02M 21/0206 123/25 A
4,112,875 A * 9/1978 Fletcher ................. F02B 43/10 123/3
2003/0230252 A1* 12/2003 Lin ......................... F02B 43/10 123/41.54
2009/0188476 A1* 7/2009 Sasajima .............. F02D 19/024 60/39.52
2011/0138793 A1* 6/2011 Coletta ............. F02M 25/0228 60/309
2017/0107950 A1* 4/2017 Hoegl ................ F02M 25/0228
2020/0078737 A1* 3/2020 Bradford ................ F02M 26/09
2020/0080520 A1* 3/2020 Op De Beeck .. F02M 35/10209
2021/0199046 A1* 7/2021 Meyers ................... F02B 43/10

FOREIGN PATENT DOCUMENTS

KR 20200118624 A * 10/2020
WO WO-0233237 A1 * 4/2002
WO WO-2020046118 A1 * 3/2020

* cited by examiner

WATER MANAGEMENT SYSTEM FOR A HYDROGEN ENGINE

CROSS-REFERENCE TO RELATED APPLICATION

This application claims under 35 U.S.C. § 119 (a) the benefit of priority to Korean Patent Application No. 10-2023-0081619 filed on Jun. 26, 2023, the entire contents of which are incorporated herein by reference.

BACKGROUND

(a) Technical Field

The present disclosure relates to a water management system for a hydrogen engine, and more particularly, to a water management system, which is capable of reducing a capacity of a water tank for storing cooling water injected into the hydrogen engine and which is capable of not requiring separate replenishment of water for the water tank.

(b) Background Art

Recently, due to the high cost of hydrogen fuel cells, the interest in development of hydrogen engines, which can utilize existing internal combustion engines, is on the rise. A hydrogen engine uses hydrogen as a fuel and a structure of the hydrogen engine is the same as that of an existing internal combustion engine.

A vehicle equipped with a hydrogen engine has an advantage of not causing air pollution but has a disadvantage compared to a hydrogen fuel cell vehicle in terms of driving or cruising range. Thus, in the case of a hydrogen engine vehicle, efficiency of a hydrogen engine is increased by applying a water injection system for spraying water into the hydrogen engine.

The conventional water spraying system lowers a temperature in a combustion chamber of a hydrogen engine using sprayed water to improve a knocking limit of the engine. Power performance and fuel efficiency of the hydrogen engine vehicle are thereby improved.

However, the conventional water spraying system requires a large-capacity water tank for storing water and periodic replenishment of water into the water tank. Thus, there is a disadvantage of degrading a degree of freedom for packaging and user convenience of the hydrogen engine vehicle.

SUMMARY

The present disclosure has been made in an effort to solve the above-described problems associated with the prior art.

In one aspect, the present disclosure provides a water management system for a hydrogen engine. The water management system is capable of reducing a capacity of a water tank for storing water supplied to the hydrogen engine and is capable of not requiring separate replenishment of water for the water tank.

Objectives of the present disclosure are not limited to the above-described objectives. The objectives of the present disclosure should become more apparent from the following description and may be achieved by the means described in the appended claims and a combination thereof.

In an embodiment, the present disclosure provides a water management system of a hydrogen engine. The water management system includes a water tank module configured to store water for cooling the hydrogen engine. The system also includes a water pump provided at the water tank module and configured to supply the water stored in the water tank module to the hydrogen engine. The system also includes an exhaust line provided between the hydrogen engine and the water tank module and configured to supply an exhaust gas, which contains water vapor discharged from the hydrogen engine, to the water tank module.

According to an embodiment of the present disclosure, the water tank module may include a cooling nozzle configured to spray the water to the exhaust gas introduced into the water tank module.

In an embodiment, the water tank module may include a water separation filter configured to discharge only air in the water tank module to the outside.

In an embodiment, the water tank module may include a main tank, which stores the water supplied to the hydrogen engine and a sub-tank, which receives the exhaust gas generated from the hydrogen engine.

In an embodiment, the cooling nozzle may be provided at the sub-tank and may spray the water to the exhaust gas introduced into the sub-tank to condense the water vapor contained in the exhaust gas.

In an embodiment, the water pump may be provided at the main tank and the cooling nozzle may receive the water of the main tank through a spray line connected to the water pump.

In an embodiment, the water pump may supply the water to the hydrogen engine through a water supply line, and the spray line may branch off from the water supply line to be connected to the cooling nozzle.

In an embodiment, the water separation filter may be provided at the sub-tank and may be configured to discharge air in the sub-tank to the outside while blocking discharge of water moisture in the sub-tank.

In an embodiment, the main tank may be provided with a jet pump configured to suction the water from the sub-tank.

In an embodiment, the jet pump may receive a portion of the water, transmitted from the water pump, as an operating fluid, may suction the water in the sub-tank, and may discharge the suctioned water to the main tank.

In an embodiment, the jet pump may be connected to the sub-tank through a suction line and a suction filter may be configured to filter foreign materials and may be provided at a front end portion of the suction line.

In an embodiment, the suction line may be provided with a sub-check valve configured to prevent back flow of the water moved from the sub-tank to the main tank through the jet pump.

In an embodiment, the exhaust line may be further provided with an exhaust cooler configured to cool the exhaust gas supplied to the sub-tank.

Other aspects and embodiments of the present disclosure are discussed herein.

It should be understood that the terms "vehicle" or "vehicular" or other similar terms as used herein are inclusive of motor vehicles in general. Thus, these terms encompass passenger automobiles including sports utility vehicles (SUV), buses, trucks, various commercial vehicles, watercraft including a variety of boats and ships, aircraft, and the like. These terms also include hybrid vehicles, electric vehicles, plug-in hybrid electric vehicles, hydrogen-powered vehicles, and other alternative fuel vehicles (e.g., fuels derived from resources other than petroleum). As referred to herein, a hybrid vehicle is a vehicle that has two or more sources of power, for example vehicles that are both gasoline-powered and electric-powered.

The above and other features of the present disclosure are discussed further below.

BRIEF DESCRIPTION OF THE DRAWINGS

The above and other features of the present disclosure are described in detail with reference to certain embodiments thereof illustrated in the accompanying drawings, which are given hereinbelow by way of illustration only, and thus are not limitative of the present disclosure, and wherein.

Figure 1:
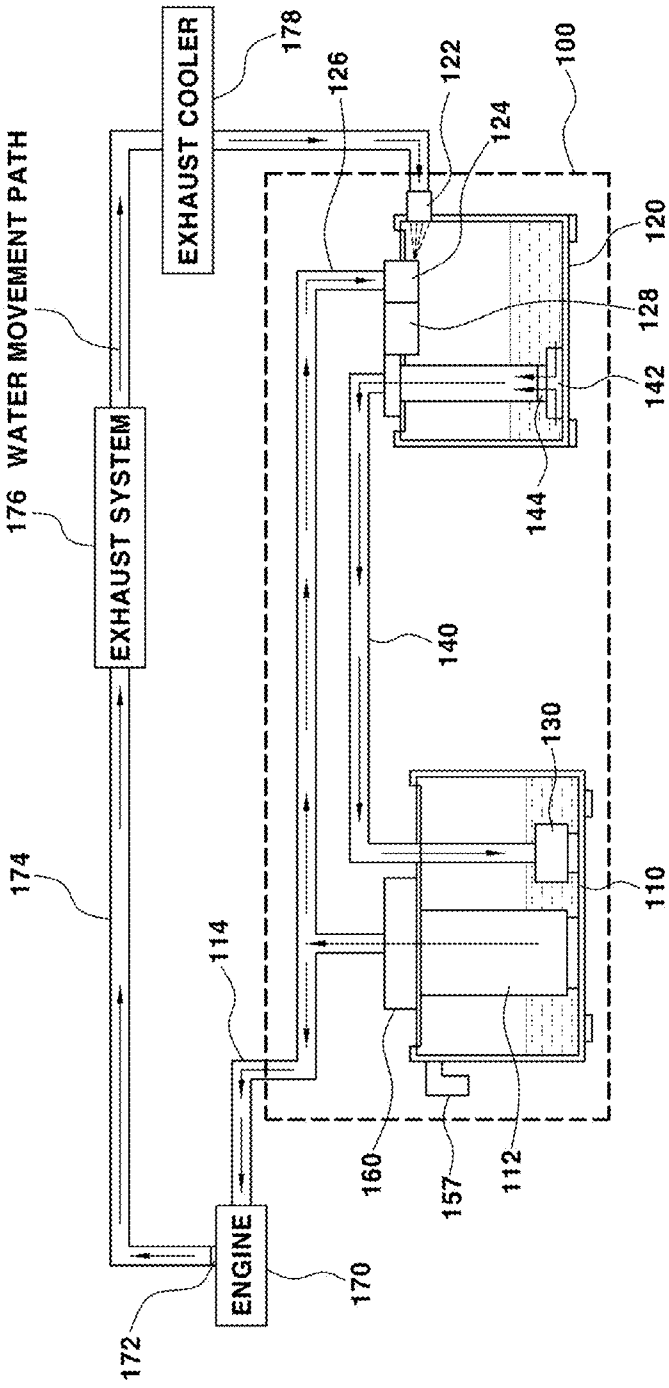
FIG. 1 is a diagram illustrating a water management system for a hydrogen engine according to an embodiment of the present disclosure.

It should be understood that the appended drawings are not necessarily drawn to scale, thus presenting a somewhat simplified representation of various features illustrative of the basic principles of the present disclosure. The specific design features of the present disclosure as disclosed herein, including, for example, specific dimensions, orientations, locations, and shapes will be determined in part by the particular intended application and use environment.

In the figures, the reference numbers refer to the same or equivalent parts of the present disclosure throughout the several figures of the drawings.

DETAILED DESCRIPTION

Hereinafter, embodiments of the present disclosure are described in detail with reference to the accompanying drawings. Items shown in the drawings are schematically illustrated so as to easily describe the embodiments of the present disclosure. Thus, the items described may be different from those actually implemented. Further, in the present disclosure, when a part is referred to as "including" a component, this means that the part can further include another component, not excluding another component unless specifically stated otherwise. Also, when a component, device, element, or the like of the present disclosure is described as having a purpose or performing an operation, function, or the like, the component, device, element, or the like should be considered herein as being "configured to" meet that purpose or to perform that operation or function. Each component, device, element, or the like, and particularly the controller, may separately embody or be included with a processor and a memory, such as a non-transitory computer readable media, as part of the apparatus.

The present disclosure relates to a water management system for a hydrogen engine, which uses hydrogen as fuel. The water management system recovers water discharged from the hydrogen engine and uses the recovered water as cooling water for the hydrogen engine. Thus, according to the present disclosure, a capacity of a tank for storing water for cooling the hydrogen engine can be reduced, and separate replenishment of water for the tank is not required.

As shown in FIG. 1, the water management system of a hydrogen engine according to an embodiment of the present disclosure includes a water tank module 100 for storing water for cooling a hydrogen engine 170.

The water tank module 100 is provided with a water pump 112. The water pump 112 supplies water stored in the water tank module 100 to the hydrogen engine 170.

An exhaust line 174 is provided between the hydrogen engine 170 and the water tank module 100. The exhaust line 174 is connected to an exhaust outlet 172 of the hydrogen engine 170 and to an exhaust inlet 122 of the water tank module 100 and delivers and supplies exhaust gas, which is generated by hydrogen combustion of the hydrogen engine 170, to the water tank module 100. Since the hydrogen engine 170 uses hydrogen as fuel, a large amount of water vapor is included in the exhaust gas. Most of the high-temperature exhaust gas discharged from the hydrogen engine 170 is water vapor.

An exhaust system 176 for processing the exhaust gas of the hydrogen engine 170 is provided at the exhaust line 174. Although not shown in the drawing, the exhaust system 176 includes an exhaust purification module (not shown) for purifying the exhaust gas. The exhaust purification module may include a catalytic converter for purifying the exhaust gas of the hydrogen engine 170. The water tank module 100 receives the exhaust gas purified by the exhaust purification module.

In addition, the water tank module 100 includes a cooling nozzle 124 for misting and spraying water to the exhaust gas introduced into the water tank module 100. The cooling nozzle 124 may be referred to as a mist nozzle.

The cooling nozzle 124 may spray water to the exhaust gas introduced into the water tank module 100 to quickly cool water vapor contained in the exhaust gas and to convert the water vapor into water. Since the water vapor introduced into the water tank module 100 is quickly cooled and condensed, water may be continuously supplied to the hydrogen engine 170 without separate replenishment of water to the water tank module 100.

In addition, the water tank module 100 includes a water separation filter 128 for discharging only air in the water tank module 100 to the outside.

The water separation filter 128 is configured to separate moisture of the exhaust gas, which is supplied into the water tank module 100, from air and to discharge only the air to the outside. The water separation filter 128 discharges the air in the water tank module 100 to the outside, thereby reducing and resolving an internal pressure of the water tank module 100, which is increased due to an inflow of the exhaust gas. The water separation filter 128 prevents an increase in internal pressure of the water tank module 100 due to the inflow of the exhaust gas, thereby allowing the exhaust gas to be smoothly introduced into the water tank module 100. In other words, the water separation filter 128 may discharge only the air to the outside while leaving the moisture in the water tank module 100, thereby increasing a water recovery rate in the water tank module 100.

As in the embodiment shown in FIG. 1, the water tank module 100 includes a main tank 110 for storing the water supplied to the hydrogen engine 170 to cool the hydrogen engine 170, and a sub-tank 120 for receiving the exhaust gas generated from the hydrogen engine 170. The water vapor of the exhaust gas introduced into the sub-tank 120 is converted into water, and the water is temporarily stored in the sub-tank 120.

Figure 2:
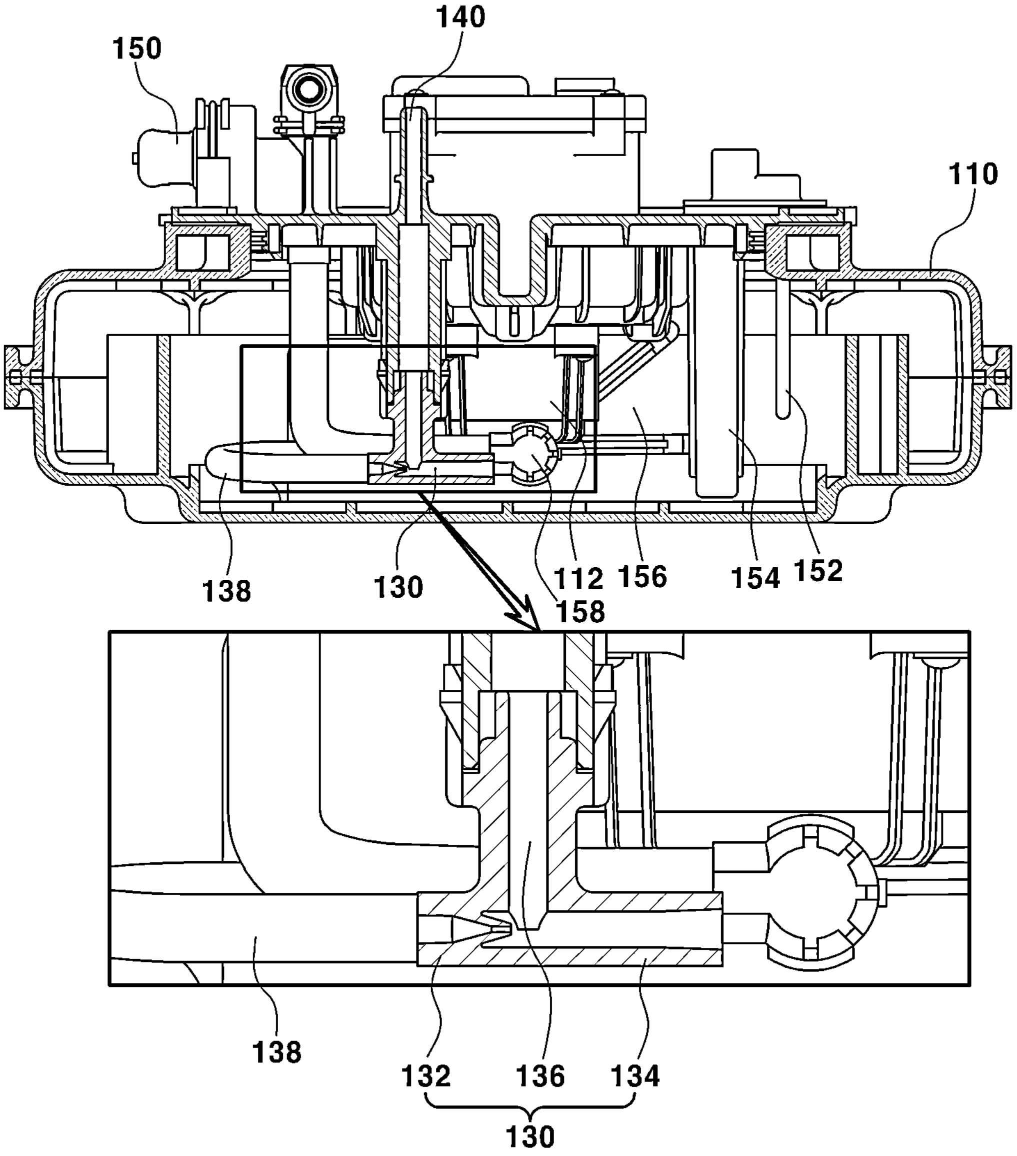
FIG. 2 is a diagram illustrating a main tank of the water management system according to an embodiment of the present disclosure.

As shown in FIGS. 1 and 2, the main tank 110 is provided with the water pump 112 for supplying the water in the main tank 110 to the hydrogen engine 170. The water pump 112 is mounted inside the main tank 110 and is connected to the hydrogen engine 170 through a water supply line 114. A spray nozzle (not shown) may be provided at a rear end portion of the water supply line 114 based on a flow direction of the water. The spray nozzle sprays the water supplied through the water supply line 114 to the hydrogen engine 170.

Figure 3:
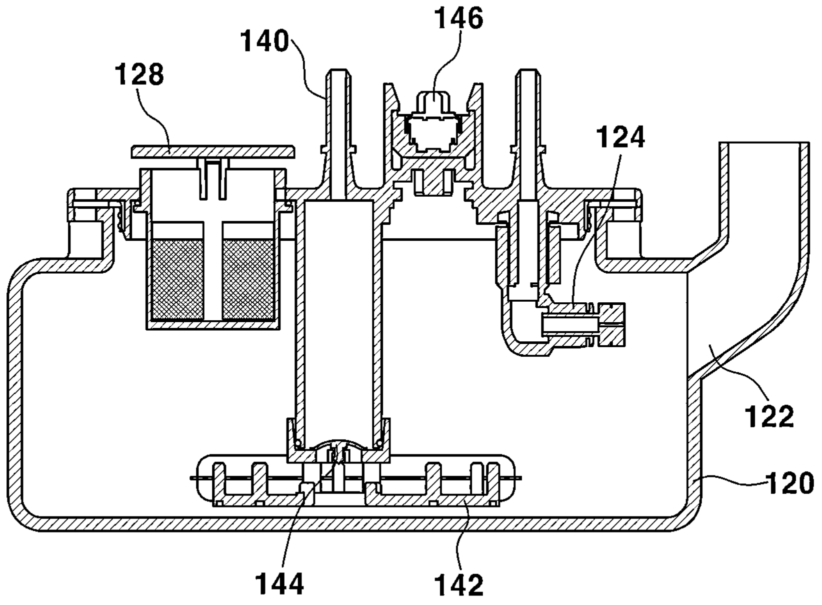
FIG. 3 is a diagram illustrating a sub-tank of the water management system according to an embodiment of the present disclosure.

As shown in FIGS. 1 and 3, the sub-tank 120 is connected to a rear end portion of the exhaust line 174 based on a flow direction of the exhaust gas. The sub-tank 120 receives the exhaust gas containing water vapor through the exhaust line 174. The sub-tank 120 is provided with the exhaust inlet 122 connected to the rear end portion of the exhaust line 174. The cooling nozzle 124 and the water separation filter 128 of the water tank module 100 are provided at the sub-tank 120.

The cooling nozzle 124 is configured to mist and spray the water supplied from the water pump 112. As shown in FIG. 3, the cooling nozzle 124 directly sprays the water to the exhaust gas introduced into the sub-tank 120 through the exhaust inlet 122. To this end, the cooling nozzle 124 is provided at the sub-tank 120 to spray the water toward the exhaust inlet 122 of the sub-tank 120. In this case, the cooling nozzle 124 is provided at the sub-tank 120 to be positioned at a predetermined distance apart from the exhaust inlet 122.

The cooling nozzle 124 sprays low-temperature water to the high-temperature exhaust gas introduced into the sub-tank 120 to rapidly condense water vapor contained in the exhaust gas and convert the water vapor into water. In other words, when the water vapor contained in the exhaust gas of the exhaust line 174 is introduced into the sub-tank 120 through the exhaust inlet 122, the water vapor is cooled and condensed by the water sprayed from the cooling nozzle 124. The water condensed and generated in the sub-tank 120 is moved to the main tank 110 through a suction line 140. The water in the sub-tank 120 is temporarily stored in the sub-tank 120 until the water is moved to the main tank 110 through the suction line 140.

Since the water vapor introduced into the sub-tank 120 is rapidly cooled and condensed, a water supply amount to be supplied to the main tank 110 is quickly secured. Water may be continuously supplied to the hydrogen engine 170 without separate replenishment of water in the main tank 110. More specifically, since the water vapor of the exhaust gas is condensed through the cooling nozzle 124, a problem caused by insufficient water supply in the sub-tank 120 compared to a water discharge amount of the main tank 110 can be prevented. In addition, since the water vapor introduced into the sub-tank 120 is quickly condensed, a pressure rise of the sub-tank 120 due to the inflow of the exhaust gas can be relatively reduced.

As shown in FIG. 3, the suction line 140 is disposed to extend to an inside of the sub-tank 120. Based on the flow direction of the water, a front end portion of the suction line 140 may extend to a position close to a bottom surface of the sub-tank 120. A suction filter 142 is provided at the front end portion of the suction line 140 to prevent an inflow of foreign materials. The suction filter 142 filters foreign materials included in the water introduced into the suction line 140 to prevent the foreign materials from being introduced into the suction line 140 and the main tank 110. In addition, the suction line 140 is provided with a sub-check valve 144 for preventing back flow of the water moved from the sub-tank 120 to the main tank 110 through the suction line 140.

As shown in FIG. 1, the cooling nozzle 124 receives the water from the main tank 110 through a spray line 126. The spray line 126 branches off from the water supply line 114 provided in the water pump 112 to be connected to the cooling nozzle 124. In other words, the spray line 126 is connected to the water pump 112 through the water supply line 114 and supplies the water supplied from the water pump 112 to the cooling nozzle 124.

The spray line 126 branches off from the water supply line 114 to be connected to the cooling nozzle 124. Thus, when the water pump 112 transmits the water from the main tank 110 to the water supply line 114, the water is also supplied to the spray line 126 and the cooling nozzle 124.

Meanwhile, an exhaust cooler 178 for cooling the exhaust gas may be further provided in front of the sub-tank 120. The exhaust cooler 178 is provided at the exhaust line 174 to be positioned in front of the exhaust inlet 122 of the sub-tank 120. The exhaust cooler 178 is configured to cool the exhaust gas supplied to the sub-tank 120 so that water vapor of the exhaust gas introduced into the sub-tank 120 may be more rapidly condensed.

As shown in FIG. 3, the water separation filter 128 is provided at an upper end portion of the sub-tank 120 and is configured to discharge only the air in the sub-tank 120 to the outside. The water separation filter 128 blocks discharge of water with a relatively large particle size among components of the exhaust gas introduced into the sub-tank 120 and discharges air with a small particle size to the outside.

Since only the air in the sub-tank 120 is discharged to the outside by the water separation filter 128, an internal pressure of the sub-tank 120 is reduced without loss of the water in the sub-tank 120 so that a rise of the internal pressure of the sub-tank 120 may be prevented. In addition, since the internal pressure of the sub-tank 120 is not raised, the exhaust gas generated from the hydrogen engine 170 is smoothly introduced into the sub-tank 120.

As shown in FIG. 2, a jet pump 130 is provided at the main tank 110. The jet pump 130 is configured to suction the water in the sub-tank 120 using the water supplied from the water pump 112 as an operating fluid. The water pump 112 is connected to a jet line 138 in addition to the water supply line 114 and the spray line 126 and supplies an operating fluid for driving the jet pump 130 to the jet line 138.

The jet pump 130 is connected to the water pump 112 through the jet line 138 and receives a portion of the water transmitted from the water pump 112 as the operating fluid. The jet pump 130 discharges the operating fluid supplied from the water pump 112 into the main tank 110 at high speed. In this case, the water in the sub-tank 120 is suctioned due to a negative pressure generated by Bernoulli's principle and discharged into the main tank 110.

Specifically, the jet pump 130 includes an operating fluid inlet 132, an operating fluid outlet 134, and a suction line connector 136. The operating fluid inlet 132 is connected to the jet line 138 to receive the operating fluid and the operating fluid outlet 134 discharges the operating fluid supplied from the operating fluid inlet 132 to the main tank 110.

In addition, the suction line connector 136 is connected to a rear end portion of the suction line 140 and is connected to the sub-tank 120 through the suction line 140. When the operating fluid is discharged from the operating fluid outlet 134 to the main tank 110, the suction line connector 136 suctions the water in the sub-tank 120 by the negative pressure generated in the operating fluid outlet 134. The suction line connector 136 discharges the water of the sub-tank 120, suctioned through the suction line 140, to the main tank 110 through the operating fluid outlet 134.

Figure 4:
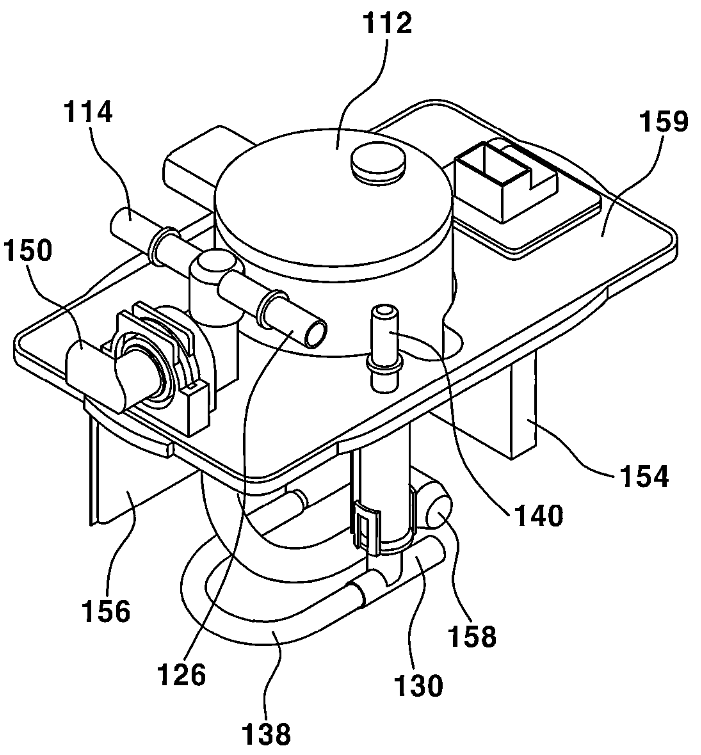
FIG. 4 is a diagram separately illustrating components mounted on the main tank of the water management system according to an embodiment of the present disclosure.

In addition, as shown in FIGS. 2 and 4, the main tank 110 is provided with a main pressure sensor 150, a temperature sensor 152, a heater 154, a pump filter 156, and a main check valve 158.

The main pressure sensor 150 measures a pressure of the water supplied from the main tank 110 to the hydrogen engine 170 through the water pump 112. Pressure information measured by the main pressure sensor 150 is transmitted to the controller 160. The controller 160 performs overall control of the water management system of the present disclosure. The controller 160 may be provided at an upper end of the main tank 110.

The controller 160 monitors a transmission pressure of the water pump 112 in real time on the basis of the pressure information transmitted from the main pressure sensor 150. The controller 160 controls driving of the water pump 112 based on the pressure measured by the main pressure sensor 150, thereby controlling a pressure of the water supplied to the hydrogen engine 170 and enabling a stable water supply to the hydrogen engine 170.

The temperature sensor 152 measures a temperature of the water in the main tank 110. Water temperature information measured by the temperature sensor 152 is transmitted to the controller 160. The heater 154 is provided to heat the water stored in the main tank 110 and is controlled by the controller 160. The controller 160 controls an operation of the heater 154 on the basis of the water temperature information of the main tank 110 received from the temperature sensor 152. When ice formation occurs in the main tank 110, the controller 160 operates the heater 154 to remove the ice. When the water in the main tank 110 is frozen, problems such as clogging of the water supply line 114 and damage to parts may occur. When the water temperature in the main tank 110 is less than a predetermined temperature, the controller 160 may determine that ice formation occurs in the main tank 110.

The pump filter 156 is provided to prevent an inflow of foreign materials into the water suctioned by the water pump 112 from the main tank 110. A non-woven filter may be applied to the pump filter 156. The pump filter 156 may be provided at the inlet of the water pump 112.

The main check valve 158 is provided to prevent a back flow of the water supplied from the water pump 112 to the hydrogen engine 170 and is provided at the outlet of the water pump 112. In addition, a mount plate 159 for fixing parts may be provided at the upper end portion of the main tank 110.

The main tank 110 has a water storage capacity that is greater than that of the sub-tank 120. For example, the water storage capacity of the main tank 110 may be three times that of the sub-tank 120. In addition, referring to FIG. 1, the main tank 110 may be provided with a drain port 157 for discharging the water in the main tank 110.

Figure 5:
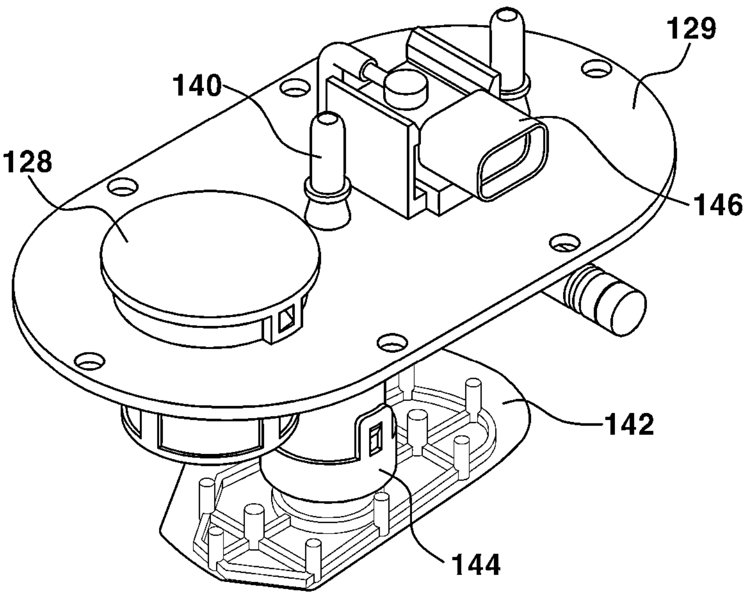
FIG. 5 is a diagram separately illustrating components mounted on the sub-tank of the water management system according to an embodiment of the present disclosure.

In addition, as shown in FIGS. 3 and 5, the sub-tank 120 is provided with a sub pressure sensor 146 for measuring the internal pressure of the sub-tank 120. The sub pressure sensor 146 transmits internal pressure information of the sub-tank 120 detected in real time to the controller 160. In addition, a mount plate 129 for fixing parts may be provided at the upper end portion of the sub-tank 120.

The controller 160 monitors the internal pressure of the sub-tank 120 in real time on the basis of the information transmitted from the sub pressure sensor 146. The controller 160 may monitor the internal pressure of the sub-tank 120 through the sub-pressure sensor 146, thereby monitoring whether water recovery to the sub-tank 120 is being performed normally. When abnormality in the internal pressure of the sub-tank 120 is detected, the controller 160 may transmit a fault code to an upper controller in the vehicle. A normal internal pressure of the sub-tank 120 is about 5 kPa or less.

Meanwhile, in the present disclosure, the water tank module 100 may include the main tank 110 and the sub-tank 120 as in the embodiment shown in FIG. 1, but the present disclosure is not necessarily limited thereto. For example, the water tank module 100 may include a single integrated tank in which the function of the main tank 110 and the function of the sub-tank 120 are integrated.

In other words, in the present disclosure, the water tank module 100 may separately include the main tank 110 for storing the water for cooling the hydrogen engine 170 and the sub-tank 120 for receiving the exhaust gas generated from the hydrogen engine 170. Alternatively, the water tank module 100 may include one integrated tank capable of performing both functions of storing the water for cooling the hydrogen engine 170 and receiving the exhaust gas generated from the hydrogen engine 170. In this case, the integrated tank may be provided with or connected to all of the components provided at or connected to the main tank 110 and the components provided at or connected to the sub-tank 120.

The present disclosure provides the following effects through the above-described problem solving features.

First, a capacity of a tank for storing water to be sprayed to a hydrogen engine can be reduced, and periodic replenishment of the water for the tank is not required. Thus, a degree of freedom of packaging for a vehicle and user convenience can be improved.

Second, by spraying the water to the hydrogen engine, a temperature in a combustion chamber of the hydrogen engine can be lowered. Thus, a knocking phenomenon of the hydrogen engine can be prevented so that power performance and fuel efficiency of the vehicle can be improved.

Although the embodiments of the present disclosure have been described in detail, the terms used in the specification and the appended claims should not be construed as being limited to ordinary or dictionary meanings. The scope of the present disclosure is not limited to these embodiments, and various modifications and improvements devised by those having ordinary skill in the art using the fundamental concept of the present disclosure, which is defined by the appended claims, further fall within the scope of the present disclosure.

What is claimed is:

1. A water management system for a hydrogen engine, the water management system comprising:

a water tank module configured to store water for cooling the hydrogen engine;

a water pump provided at the water tank module and configured to supply the water stored in the water tank module to the hydrogen engine; and an exhaust line provided between the hydrogen engine and the water tank module and configured to supply an exhaust gas, which contains water vapor discharged from the hydrogen engine, to the water tank module at an exhaust inlet, wherein the water tank module includes a cooling nozzle configured to spray the water towards the exhaust gas introduced into the water tank module, and wherein the cooling nozzle is located to face the exhaust inlet.

2. The water management system of claim 1, wherein the water tank module includes a water separation filter configured to discharge air in the water tank module to the outside.

3. The water management system of claim 2, wherein the water tank module includes a main tank configured to store the water supplied to the hydrogen engine and a sub-tank configured to receive the exhaust gas generated from the hydrogen engine.

4. The water management system of claim 3, wherein the cooling nozzle is provided at the sub-tank and sprays the water to the exhaust gas introduced into the sub-tank to condense the water vapor contained in the exhaust gas.

5. The water management system of claim 3, wherein the water pump is provided at the main tank and wherein the cooling nozzle receives the water of the main tank through a spray line connected to the water pump.

6. The water management system of claim 5, wherein the water pump supplies the water to the hydrogen engine through a water supply line and wherein the spray line branches off from the water supply line to be connected to the cooling nozzle.

7. The water management system of claim 3, wherein the water separation filter is provided at the sub-tank and is configured to discharge air in the sub-tank to the outside while blocking a discharge of water moisture in the sub-tank.

8. The water management system of claim 3, wherein the main tank includes a jet pump configured to suction the water from the sub-tank.

9. The water management system of claim 8, wherein the jet pump receives a portion of the water, transmitted from the water pump, as an operating fluid, suctions the water in the sub-tank, and discharges the suctioned water to the main tank.

10. The water management system of claim 8, wherein the jet pump is connected to the sub-tank through a suction line and wherein a suction filter, configured to filter foreign materials, is provided at a front end portion of the suction line.

11. The water management system of claim 10, wherein the suction line includes a check valve configured to prevent a back flow of the water moved from the sub-tank to the main tank through the jet pump.

12. The water management system of claim 3, wherein the exhaust line further includes an exhaust cooler configured to cool the exhaust gas supplied to the sub-tank.

* * * * *